US005144510A

United States Patent [19]

Kaczmarek

[11] Patent Number: 5,144,510

[45] Date of Patent: Sep. 1, 1992

[54] CONDUCTIVE PEDESTAL FOR USE WITH SOLID STATE OVERVOLTAGE ARRESTER

[75] Inventor: Richard Kaczmarek, Chicago, Ill.

[73] Assignee: Reliance Comm/Tec Corporation, Chicago, Ill.

[21] Appl. No.: 655,641

[22] Filed: Feb. 14, 1991

[51] Int. Cl.[5] ........ H02H 9/04

[52] U.S. Cl. ........ 361/119; 361/117; 361/118

[58] Field of Search ........ 361/117-119

[56] References Cited

U.S. PATENT DOCUMENTS 4,866,562 9/1989 Jones ........ 361/119
4,876,626 10/1989 Kaczmarek ........ 361/119
4,958,253 9/1990 Gilberts et al. ........ 361/119

*Primary Examiner*—Steven L. Stephan

*Assistant Examiner*—Thomas M. Dougherty

*Attorney, Agent, or Firm*—Trexler, Bushnell, Giangiorgi & Blackstone, Ltd.

[57] ABSTRACT

A line protector for a communications circuit provides at least overvoltage protection. The overvoltage protection is obtained through a solid state arrester such as a diode. As the solid state arrester is not as long as the carbon electrode type or gas tube arrester which it replaces, the line protector includes a hollow conductive pedestal. The hollow conductive pedestal, which may be a deep drawn cup, provides sufficient flexibility to avoid damaging the arrester when the line protector is subjected to a drop test. The end of the pedestal adjacent to the solid state arrester is shaped to receive one electrode of the arrester, while the other end of the pedestal is shaped to provide a good contact to the grounding circuit of the protector.

15 Claims, 2 Drawing Sheets

CONDUCTIVE PEDESTAL FOR USE WITH SOLID STATE OVERVOLTAGE ARRESTER

BACKGROUND OF THE INVENTION

1. Field of the Invention

This invention relates to improvements in line protectors of the type that are located between equipment to be protected and the outside lines which arrive at the site where the equipment is located and use solid state overvoltage arresters.

2. Description of the Prior Art

There has been a trend in the telecommunications industry to use solid state devices as overvoltage arresters in place of either gas tubes or carbon elements. Carbon element and gas tube surge arresting devices rely on an arc discharge to initiate protection. This discharge may cause degradation in the performance of the device which, over time, creates different types of in-service problems. Those problems can range from short circuits to various forms of low voltage operation and current leakage. The degradation can also cause disturbances on the telephone line which are noticeable to the subscriber, who brings them to the attention of the operating company providing the service. The operating company must then have its personnel investigate such "trouble" reports, resulting in the expenditure of both time and money.

Solid state overvoltage arresters, on the other hand, provide noise-free transmission and have a greatly reduced maintenance and longer service life as compared to the carbon element or gas tube surge arresting devices. Therefore, it is desirable to use, wherever possible, solid state overvoltage devices in place of carbon element or gas tube devices. It is further desirable to be able to insert such solid state devices directly in existing line protector units in place of either the carbon element or gas tube surge arresting devices presently used in those units.

One example of such a line protector is shown in U.S. Pat. No. 4,958,253 entitled "Line Protector For A Communications Circuit" (hereinafter "the '253 patent") which is assigned to the same assignee as is the present invention. The line protector shown and described in the '253 patent uses a solid state overvoltage arrester and has a solid conductive pedestal between one electrode of the arrester and the closed end of the cup which contains the arrester. The closed end of the cup is in contact with the ground pin of the protector. The pedestal provides the conductive path between the arrester and the cup upon the occurrence of a transient overvoltage condition on either of the two wires in the telephone line pair to which the protector is connected.

It is desirable to reduce the cost of the line protector described in the '253 patent. The cost can be reduced if a nonsolid pedestal can be used in place of the solid pedestal used in the protector of the '253 patent.

Line protectors are subject to a number of standard tests. One such test is the drop test wherein the protector is dropped from a predetermined height, typically five (5) feet, onto a hard surface such as a concrete floor. The drop test is meant to simulate the inadvertent dropping of a line protector by an individual such as a telephone company craftsperson. It has been found in the protector of the '253 patent that the solid state arrester may be damaged during the drop test. Therefore, the protector of the '253 patent may not always pass the drop test.

I believe the main reason that the protector of the '253 patent does not always pass the drop test is the mass of the solid conductive pedestal. I also believe that the solid conductive pedestal may not be flexible enough. Therefore, it is desirable to reduce the mass of the solid pedestal by replacing it with one that is nonsolid. The nonsolid pedestal also reduces the cost of the protector. In addition, it is further desirable at the same time to provide flexibility in the pedestal to overcome any possibility that the nonsolid pedestal might damage the arrester during the drop test.

SUMMARY OF THE INVENTION

A line protector for a communications circuit which includes means for connection to ground; a solid state overvoltage arrester which has first and second electrodes, the first electrode connected to first and second line terminals; and a hollow conductive pedestal having a first end which receives the second electrode and a second end which is in connection with the ground connection means.

DESCRIPTION OF THE PREFERRED EMBODIMENT

Figure 1:
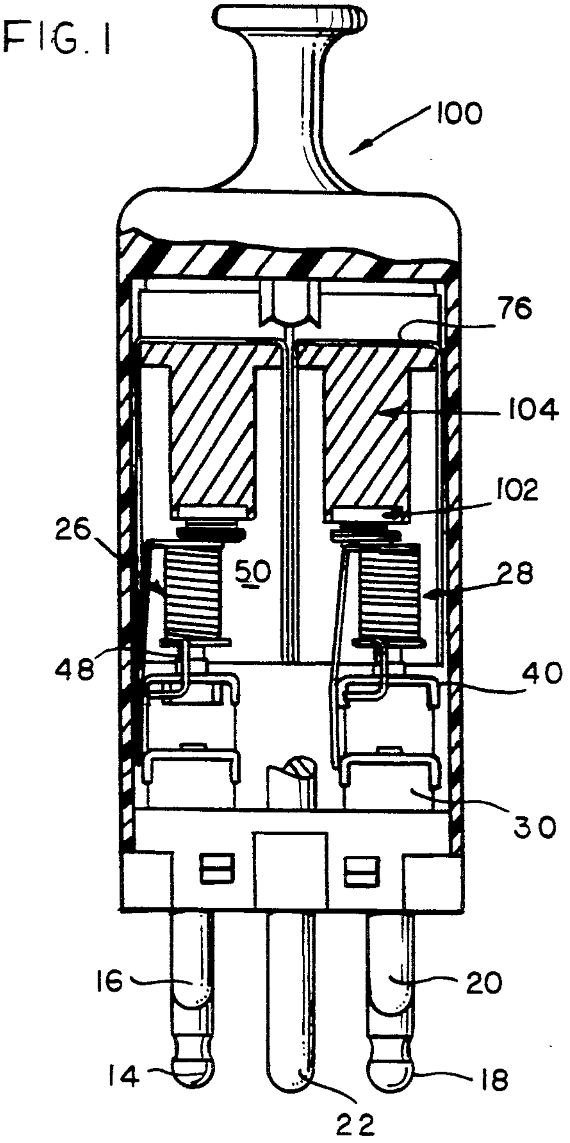
FIG. 1 is a front elevational view, partially in section, of the line protector of the '253 patent.
Figure 2:
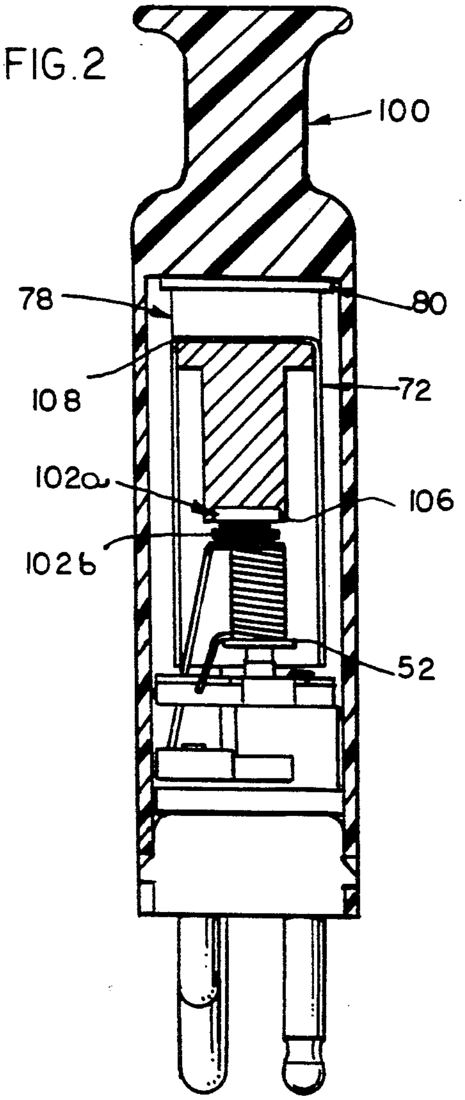
FIG. 2 is a side elevational view, partially in section, of the line protector of FIG. 1.

Referring now to FIGS. 1 and 2, there are shown a front elevational view in section and a side elevational view also in section, respectively of the line protector 100 of the '253 patent.

Protector 100 has a generally rectilinear insulating plastic housing 4, the upper end of which has a neck portion 6 which terminates in a flange 8 by which the protector may be gripped for removal from and placement into a plug-in type terminal board having wired connections to the incoming outside lines and also to the equipment to be protected. At its lower end the housing is closed off by a plastic base 10 containing a plurality of laterally projecting tabs 12. These tabs interlock with a snap fit into openings 13 that are formed on the two wider opposite walls of the housing 4 adjacent to the resilient lower open end of the housing.

Projecting downwardly and through the base 10 is a series of conductive plug-in terminal pins 14, 16, 18, 20 and 22. There is a first line pin 14, a shorter first central office pin 16, a second line pin 18, a shorter second central office pin 20, and a ground pin 22. For ease of illustration, only a portion of ground terminal pin 22 has been shown internal to protector 100. As is well known in the art, protector 100 may also include a plastic polarizing pin (not shown) if the same is needed to ensure proper orientation of the protector when it is plugged into its receptacle.

The first line pin 14 and the first central office line pin 16 are components in one of the two lines (tip or ring) through the protector, while the second line pin 18 and the second central office line pin 20 are components in the other line through the protector. The ground pin 22 is suitably connected through the plug-in receptacle to ground in a known manner.

Running from the line pin 14 to the central office line pin 16 is a heat coil circuit 26, and similarly running between the line pin 18 and the central office line pin 20 is a like heat coil circuit 28. These heat coil circuits are of similar construction and a detailed description of their construction may be obtained by referring to U.S. Pat. No. 4,168,515 which is also assigned to the same assignee as is the present invention. Each heat coil circuit is characterized by the fact that there are rigid or permanent connections from one line pin (e.g. 18) to the other line pin (e.g. 20). These connections are preferably effected by staking the line pins to contact plates and by welding the ends of the heat coil winding to the respective contact plates.

The protector also includes a sub-base 30. The specifics of its construction and the manner in which the sub-base interacts with the heat coil circuits 26 and 28 may be obtained by referring to U.S. Pat. No. 4,168,515.

Also mounted within the housing 4 and associated with the line circuit running from line pin 14 to central office line pin 16 is an overvoltage arrester unit 102 which is of the solid state type and more particularly a diode. A like arrester unit 102 is associated with the circuit running from line pin 18 to central office line pin 20.

Line protector 100 also includes a solid conductive pedestal 104 which has a lower end 106 in contact with the upper electrode **102*a* of the diode. Pedestal 104 has an upper end 108 which is in contact with the end wall 76 of the cup, i.e. the grounding circuit of the protector. The lower electrode 102*b*** of the diode is in contact with the upper end of the heat coil bobbin.

The overvoltage arrester unit 102 and pedestal 104 are housed within an inverted metallic cup 72 which also receives the heat coil bobbin 50. The lower open end 74 of the cup 72 is spaced from the plate 40 a distance which is less than the distance from the lower end of the bobbin 50 to the plate 40.

Interposed between the end wall 76 of the cup 72 and the upper end of the housing 4 is a volute spring 78. This volute spring 78 applies pressure to the cup 72 which in turn presses the conductive pedestal 104 and arrester unit 102 against the bobbin 50; however, the bobbin stays fixed relative to the pin 48 so long as the fusible solder material used to hold the pin 48 in place in the bobbin remains solid.

The upper end of the volute spring 78 presses against a grounding plate 80 which is positioned against the upper closed end of the housing 4. The grounding plate 80 is of such extent that it contacts both of the two volute springs 78 in protector 100 that are each associated with a respective one of the circuits described above. The grounding plate is metallic and is staked or otherwise rigidly secured to the ground pin 22 which runs downwardly between the assemblies (heat coil circuit, arrester, pedestal) in each half of the housing so as to project through the base 10.

In a transient overvoltage condition (also known as a surge) in one of the lines, for example the line in which pins 18 and 20 are located, the voltage will be applied through line pin 18, plate 40, heat coil pin 48 and bobbin 50 to the lower electrode **102*b*. This voltage will cause the diode 102 to conduct and a current will flow through pedestal 104, cup 72, volute spring 78, ground plate 80 and ground pin 22** to ground. Under such conditions, the unit is generally self-restoring, requiring no attention of service personnel.

In an overcurrent condition in the line circuit between pins 18 and 20, the heat coil winding 26 will generate sufficient heat to melt the solder 52 whereby the pressure from the volute spring 78, transmitted through to the pedestal 104 and diode 102, will press against the bobbin 50 causing it to slide downwardly along the pin 48. The action of the spring 78 will also move the metallic cup 72 downwardly until its lower end 74 engages the upper plate 40. The electrical contact between the cup 72 and the plate 40 will immediately ground the line through the ground pin 22.

Figure 3:
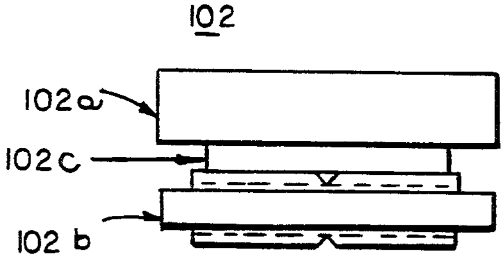
FIG. 3 is a side view of the solid state diode used in the line protector of FIGS. 1 and 2.

Referring now to FIG. 3, there is shown a side view of diode 102. Circular electrodes **102*a* and 102*b* are connected to each other by a semiconductor junction 102*c***. The junction may for example, be of the glass-passivated pnpn silicon type and may be connected to the electrodes by soldering. A diode of the type described is available from Teccor Electronics of Irving, Texas.

Figure 4:
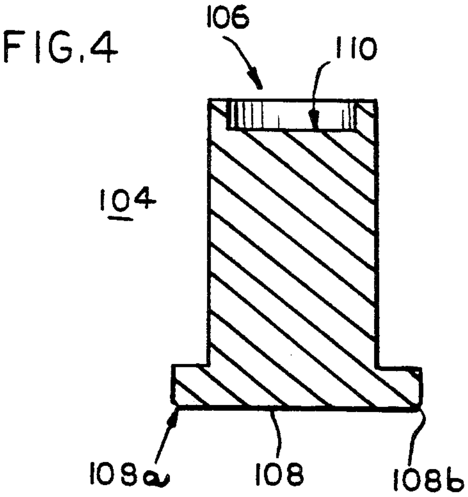
FIG. 4 is a sectional view of the solid conductive pedestal of the line protector of the '253 patent.

Referring now to FIG. 4, there is shown a close-up of the solid conductive pedestal 104 of FIGS. 1 and 2. As in those figures, the pedestal is shown in section. Pedestal 104 is essentially cylindrical in shape with its upper end 108 having a larger diameter than the remainder of the pedestal. Of course, the diameter of the upper end must be no greater than the inner diameter of cup 72. The upper end includes chamfers **108*a* and 108*b*** so that the pedestal makes a relatively snug fit with the end wall of the cup.

The lower end 106 includes a counterbore 110 which has an inner diameter which is slightly greater than the diameter of the upper electrode **102*a* of diode 102. As can be seen by referring to FIG. 4, the diameter of electrode 102*a* is slightly larger than the diameter of electrode 102*b*. Counterbore 110 as shown in FIG. 4 has a depth which is slightly less than the depth of either electrode 102*a* and 102*b*. It should be clear that the depth of counterbore 110 can be greater than that shown in FIG. 4, the only requirement being that end 106 is sufficiently distant from electrode 102*b* so that the pedestal does not come into contact with that electrode when the diode is placed in the counterbore. While diode 102 has been shown in FIG. 4 as having an electrode 102*b* whose diameter is less than that of electrode 102*a*, diode 102 can have both electrodes having a diameter equal to that of electrode 102*a***. This eliminates any necessity to orient the diode before it is placed in the counterbore.

Referring now to FIGS. **5*a*, 5*b* and 5*c* there are shown perspective, top and sectional views of the hollow pedestal 110 of the present invention. Pedestal 110, which may be a deep drawn cup, is essentially cylindrical in shape. Its upper end 112 has a flange 114 whose outer diameter is greater than the outer diameter of the body 116 of the pedestal. As with pedestal 104, the outer diameter of upper end 112 of pedestal 110 must be no greater than the inner diameter of cup 72. The circular flange 114 ensures that the pedestal 110 makes a good electrical contact with the end wall of cup 72**.

The lower end 118 of the pedestal 110 includes a shallow essentially U shaped recess 120 having a diameter between the recess walls 120*a* and 120*b* which is slightly larger than the diameter of electrode 102*a* of diode 102 (or of electrode 102*b* if the diode is of the type which has equal diameter electrodes). The recess seat 122 has a circular middle portion 122*a* which is slightly closer to lower end 118 than the toroidally shaped outer portion 122*b* of the recess seat. In other words, portion 122*a* is raised above portion 122*b*. The depth of the recess as measured from lower end 118 to the middle portion of the recess seat is slightly less than the depth of either of electrodes 102*a* and 102*b*. The middle portion 122*a* has an opening 122*c* at its center which is shown in FIG. 5*b* as a circular hole.

I have found that a line protector 100, which uses the pedestal 110 of the present invention in place of pedestal 104, always passes the drop test. I believe that raised portion 122*a* of recess seat 122 flexes to act as a "shock absorber" when the protector is dropped. This flexing action ensure that the solid state arrester will not be damaged. I have also found that while raised portion 122*a* may be solid, the opening 122*c* therein provides further flexibility. Tests have shown that when the pedestal 110 is used in the line protector 100, the protector will pass multiple (four or more) drop tests before the raised portion 122*a* no longer acts as a shock absorber. Thereafter the diode must absorb any shock that was absorbed by the pedestal.

Figure 5A:
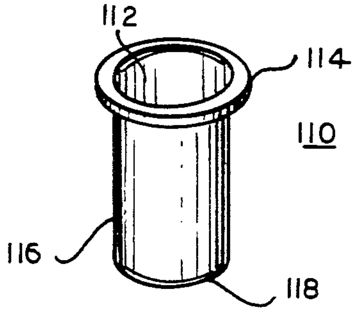
FIGS. 5*a*, 5*b* and 5*c* are perspective, top and sectional views of the pedestal of the present invention.
Figure 5B:
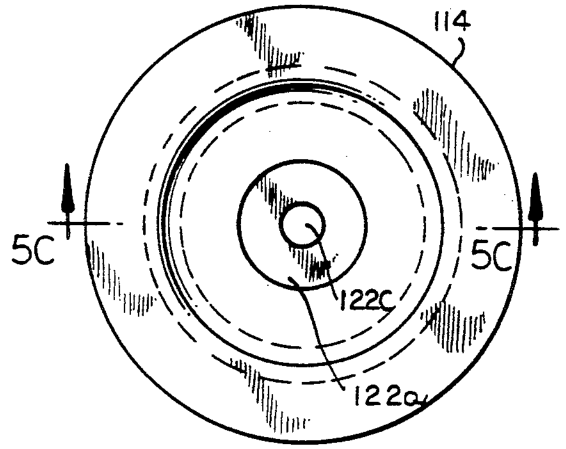
Figure 5C:
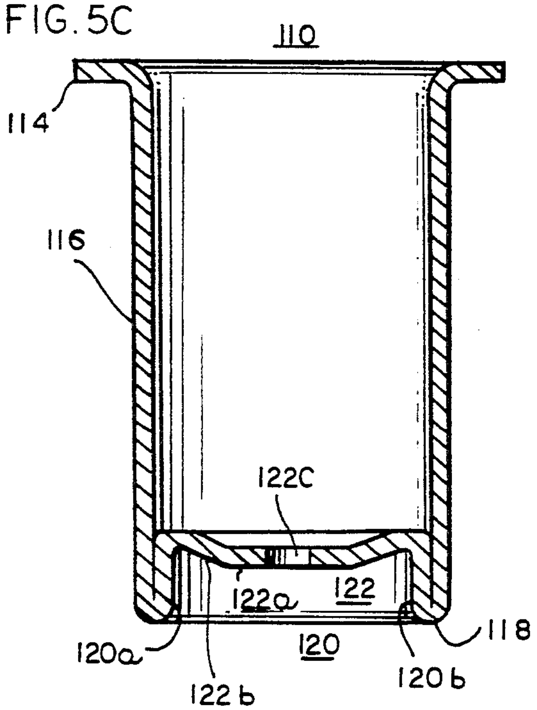
Figure 6A:
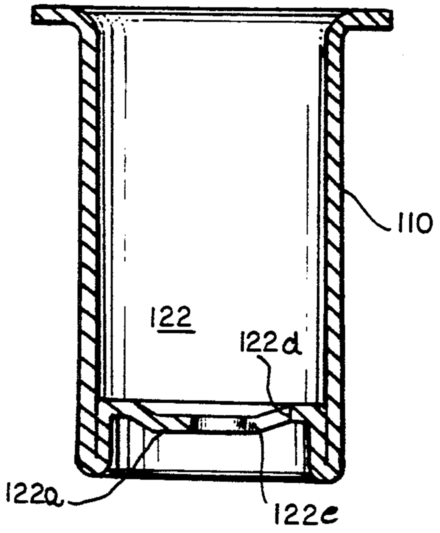
FIGS. 6*a* and 6*b* are a sectional view and a bottom view, respectively, of the pedestal of the present invention which show another shape for the opening in the raised portion of the recess seat of the pedestal.
Figure 6B:
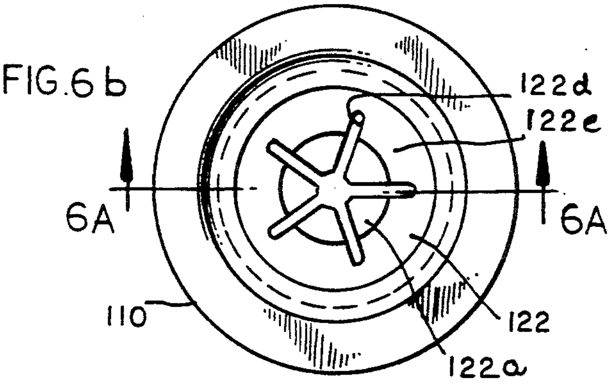

While opening 122*c* has been shown in FIG. 5*b* as a circular hole, the opening may have other shapes. One such shape may be the five pointed "star like" shape 122*d* shown in FIGS. 6*a* and 6*b*. This shape gives rise to five identical cantilevers springs 122*e*. I believe that such a shape provides more flexibility than the circular hole shown in FIG. 5*b*.

It should be understood that as the mass of pedestal 110 is substantially less than the mass of the solid pedestal described in the '253 patent, the likelihood that a protector using pedestal 110 will pass repeated drop tests is substantially increased as compared to a protector using the solid pedestal even in the absence of the raised portion acting as a shock absorber. In the tests described above, pedestal 110 was embodied using brass, the thickness of recess seat was nominally 0.013 inches (about 0.33 mm) and the opening in the recess was a circular hole. Of course, the thickness can be varied to suit the particular construction, other conductive materials may be used for the pedestal may to enhance the ability of the raised portion to act as a shock absorber and the opening can be other than a circular hole.

While not shown herein, those skilled in the art will immediately recognize that the pedestal 110 and solid state diode 102 may also be used in those protectors which do not use a heat coil. Such protectors may either have a conductive spacer in place of the heat coil as is shown in assignee's U.S. Pat. No. 3,849,750 or not include the spacer in which case the lower electrodes of the overvoltage arrester is in direct contact with the line pins 14 and 16 or 18 and 20. One example of the latter type of protector is the R3B1A unit sold by assignee's Reliable Electric operating unit. In such a protector a solder pellet would be included between the upper end 112 of pedestal 110 and the end wall of cup 76.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A line protector for a communications circuit comprising:

a) means for connections to ground;

b) a solid state overvoltage arrester having first and second electrodes, said first electrode connected to first and second line terminals; and c) a hollow conductive pedestal having a first end, said first end receiving said second electrodes, and a second end in contact with said ground connection means;

wherein said conductive pedestal first end has a U shaped recess for receiving said second electrode, said U shaped recess having a middle portion which is closer to said pedestal first end than the rest of said U shaped recess.

2. The line protector of claim 1 wherein said conductive pedestal and said second electrode are both essentially cylindrical in shape, the diameter of said U shaped recess is slightly greater than the diameter of said second electrode ans said U shaped recess middle portion is essentially circular.

3. The line protector of claim 2 wherein said essentially circular U shaped recess middle portion has an opening at its center.

4. The line protector of claim 1 wherein said means for connection to ground includes a conductive cup having an open end and an end wall, said cup containing said solid state overvoltage arrester and said conductive pedestal such that said pedestal second end is in contact with said end wall.

5. The line protector of claim 1 wherein said cup has a predetermined shape and said pedestal second end is of essentially complementary shape to provide a snug fit with said cup.

6. The line protector of claim 1 wherein said means for connection to ground includes a conductive cup having an open end and an end wall, said cup containing said solid state overvoltage arrester and said conductive pedestal such that said pedestal second end is in contact with said end wall.

7. The line protector of claim 1 wherein said hollow conductive pedestal is a deep drawn cup.

8. The line protector of claim 2 wherein said hollow conductive pedestal is a deep drawn cup.

9. The line protector of claim 4 wherein said hollow conductive pedestal is a deep drawn cup.

10. The line protector of claim 6 wherein said hollow conductive pedestal is a deep drawn cup.

11. An overvoltage arrester comprising:

a) a solid state device having first and second electrodes; and b) a hollow conductive pedestal having a first end for receiving said second electrode and a second end for connection to means for providing a connection to group;

wherein said pedestal first end has a U shaped recess having a middle portion which is closer to said pedestal first end than the rest of said U shaped recess. middle portion which is closer to said pedestal first end than the rest of said U shaped recess.

12. The assembly of claim 11 wherein both said pedestal and said second electrode are essentially cylindrical in shape and the diameter of said U shaped recess is slightly greater than the diameter of said second electrode and said U shaped recess middle portion is essentially circular.

13. The assembly of claim 12 wherein said essentially circular U shaped recess middle portion has an opening at its center.

14. An overvoltage arrester assembly comprising:

a) a solid state device having first and second electrodes; and b) a hollow conductive pedestal having a first end receiving said second electrode and a second end for connection to means for providing a connection to ground; wherein said hollow conductive pedestal is a deep drawn cup.

15. The assembly of claim 11 wherein said hollow conductive pedestal is a deep drawn cup.

* * * * *

UNITED STATES PATENT AND TRADEMARK OFFICE
CERTIFICATE OF CORRECTION

PATENT NO. : 5,144,510

DATED : September 1, 1992

INVENTOR(S) : Richard Kaczmarek

It is certified that error appears in the above-identified patent and that said Letters Patent is hereby corrected as shown below:

Column 6, Lines 65-66 " recess. middle portion which is closer to said pedestal first end than the rest of said U shaped recess. " should be -- recess. --

Signed and Sealed this

Nineteenth Day of October, 1993

Attest:

BRUCE LEHMAN

*Attesting Officer* *Commissioner of Patents and Trademarks*